United States Patent

Torii

[11] Patent Number: 5,215,165
[45] Date of Patent: Jun. 1, 1993

[54] OIL PUMP

[75] Inventor: Akira Torii, Kanagawa, Japan

[73] Assignee: Atsugi Unisia Corporation, Japan

[21] Appl. No.: 836,701

[22] Filed: Feb. 18, 1992

[30] Foreign Application Priority Data

Feb. 19, 1991 [JP] Japan ............... 3-7046[U]

[51] Int. Cl.$^5$ .............................. F16N 13/20
[52] U.S. Cl. ...................... 184/31; 184/6.28; 418/171; 418/182
[58] Field of Search .............. 184/31, 6.28, 6.27; 418/171, 166, 182; 403/365, 356, 383, 259

[56] References Cited

U.S. PATENT DOCUMENTS

| | | | |
|---|---|---|---|
| 3,244,111 | 4/1966 | Shelhart | 418/171 |
| 3,697,201 | 10/1972 | Eickmann | 418/182 |
| 3,824,047 | 7/1974 | McDermott | 418/171 |
| 4,006,993 | 2/1977 | Woerlee | 403/365 |
| 4,361,419 | 11/1982 | Vohringer | 418/171 |
| 4,820,138 | 4/1989 | Bollinger | 418/171 |

FOREIGN PATENT DOCUMENTS 1553032  9/1969  Fed. Rep. of Germany ...... 418/171
63-126506  8/1988  Japan .
1-76582  5/1989  Japan .

Primary Examiner—Ira S. Lazarus
Assistant Examiner—Alan B. Cariaso
Attorney, Agent, or Firm—Ronald P. Kananen

[57] ABSTRACT

A rotor-type oil pump for supplying lubricating oil to an automotive internal combustion engine. The oil pump is comprised of inner and outer rotors which are rotatably disposed inside a pump casing. The inner rotor is formed with an external gear partly in mesh with an internal gear of the outer rotor. The inner rotor is fixedly mounted on a drive shaft forming part of an engine crankshaft and formed at its inner peripheral surface with at least three flat surface portions which are located at equal intervals in the peripheral direction. The at least three flat surface portions of the inner rotor are fittingly contactable respectively with at least three flat surface portions formed at the peripheral surface of the drive shaft, thereby preventing the inner rotor from shifting radially upon receiving a biasing force (due to a pressure differential) directing to an oil inlet chamber side.

7 Claims, 3 Drawing Sheets

OIL PUMP

BACKGROUND OF THE INVENTION

1. Field of the Invention

This invention relates to improvements in an oil pump for supplying oil, and more particularly to an oil pump for supplying lubricating oil to necessary parts in an automotive engine.

2. Description of the Prior Art

A variety of oil pumps have been proposed and put into practical use. A typical one of them is disclosed in Japanese Utility Model Publication No. 1-76582, in which inner and outer cylindrical rotors are rotatably disposed inside a pump casing. The inner rotor is fixedly mounted on one end section of a drive shaft and formed with an external gear which is in mesh with an internal gear of the outer rotor. The drive shaft is formed at the peripheral surface of its one end section with two flat surface portions which are parallel with and spaced from each other. During operation of the oil pump, the torque from the drive shaft is transmitted through the two flat surface portions to the inner rotor.

Additionally, Japanese Utility Model Provisional Publication No. 63-126506 discloses an oil pump similar to the above-discussed one. In this oil pump, an annular drive spacer is interposed between a drive shaft and an inner rotor. The drive spacer is formed with the two parallel flat surface portions and fixed to the drive shaft by means of a key.

However, drawbacks have been encountered in all of the above-discussed conventional oil pumps. That is to say, since driving of the inner rotor is carried out through the two parallel flat surface portions, the inner rotor is unavoidably pushed and moved toward an oil inlet chamber side under oil discharge pressure at an oil outlet chamber side when the two parallel flat surface portions come to a position to extend in the direction connecting the oil inlet and outlet chambers. As a result, the external gear of the inner rotor and the internal gear of the outer rotor interfere with each other thereby generating gear noise.

SUMMARY OF THE INVENTION

It is an object of the present invention to provide an improved oil pump which effectively solves the above-discussed drawbacks encountered in the conventional oil pumps.

Another object of the present invention is to provide an improved oil pump which effectively suppresses noise generation due to interference of the external gear of an inner rotor and the internal gear of an outer rotor.

A further object of the present invention is to provide an improved oil pump arrangement in which an inner rotor partly meshed with an outer rotor can be effectively prevented from shifting toward an oil inlet chamber side even upon being subjected to a pressure difference between oil inlet and outlet chambers.

An oil pump of the present invention is comprised of a pump casing. A generally annular outer rotor is rotatably disposed in the pump casing and has an internal gear. A generally annular inner rotor is rotatably disposed inside the outer rotor and has an external gear which is partly in mesh with the internal gear of the outer rotor. The inner rotor is formed at its inner peripheral surface with at least three flat surface portions which are peripherally separate from each other. The extensions of the respective flat surface portions intersect each other. Additionally, a drive shaft is provided in such a manner that the inner rotor is coaxially and fixedly mounted thereon. The drive shaft is formed at its peripheral surface with at least three flat surface portions which are respectively contactable with the at least three flat surface portions of the inner rotor. The at least three flat surfaces of the drive shaft are parallel respectively with the at least three flat surface portions of the inner rotor.

Accordingly, even when the inner rotor is biased radially under oil discharge pressure during driving of the inner rotor, at least one of the three flat surface portions of the drive shaft resists against the biasing force, thereby preventing the inner rotor from shifting toward an oil inlet chamber side. Thus, the behavior of the inner rotor within the pump casing is stabilized, thereby reducing gear noise in the oil pump.

BRIEF DESCRIPTION OF THE INVENTION

In the drawings, like reference numerals designate like elements and parts throughout all the figures, in which.

DETAILED DESCRIPTION OF THE INVENTION

Figure 1:
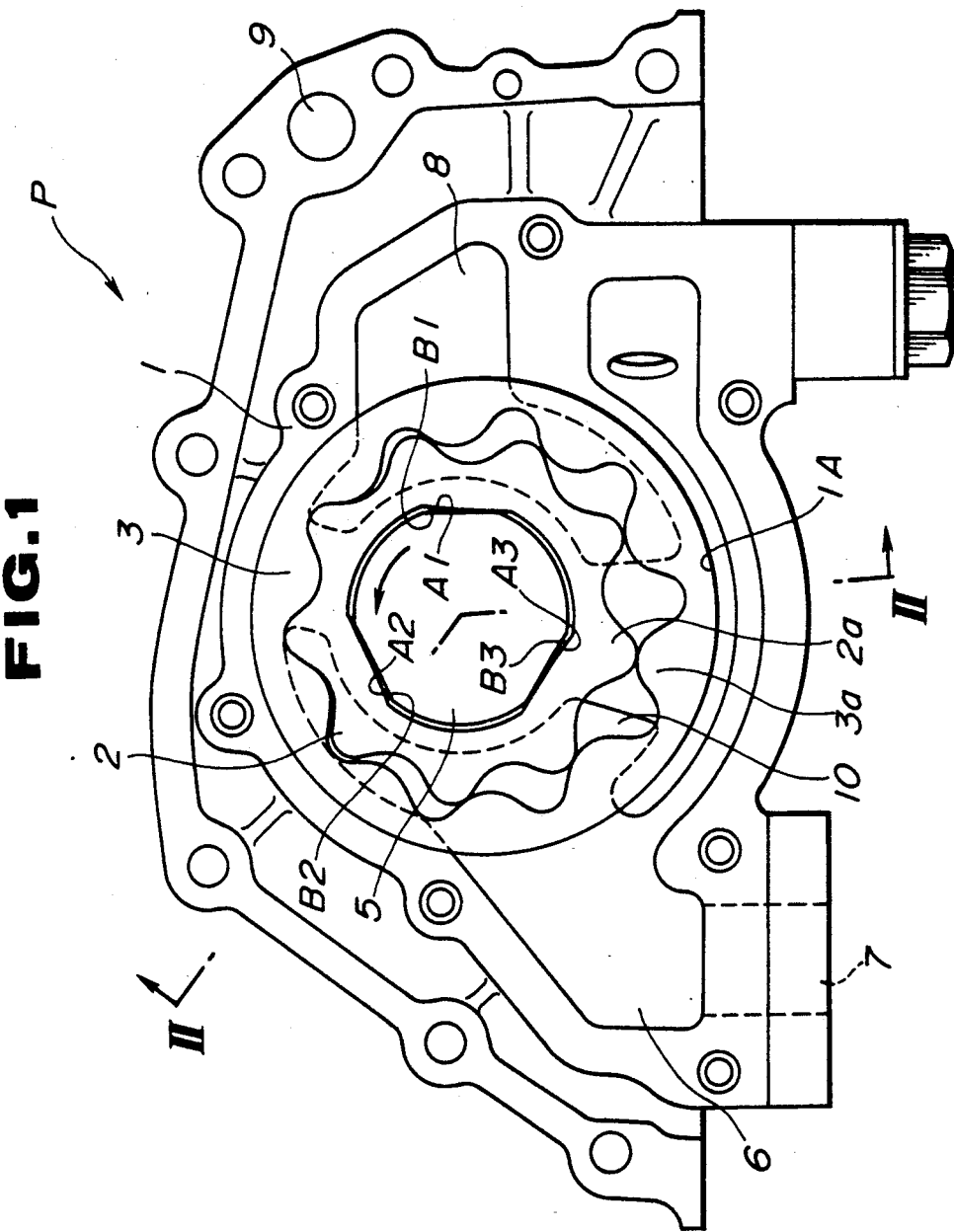
FIG. 1 is a front elevation of an embodiment of an oil pump in accordance with the present invention.
Figure 2:
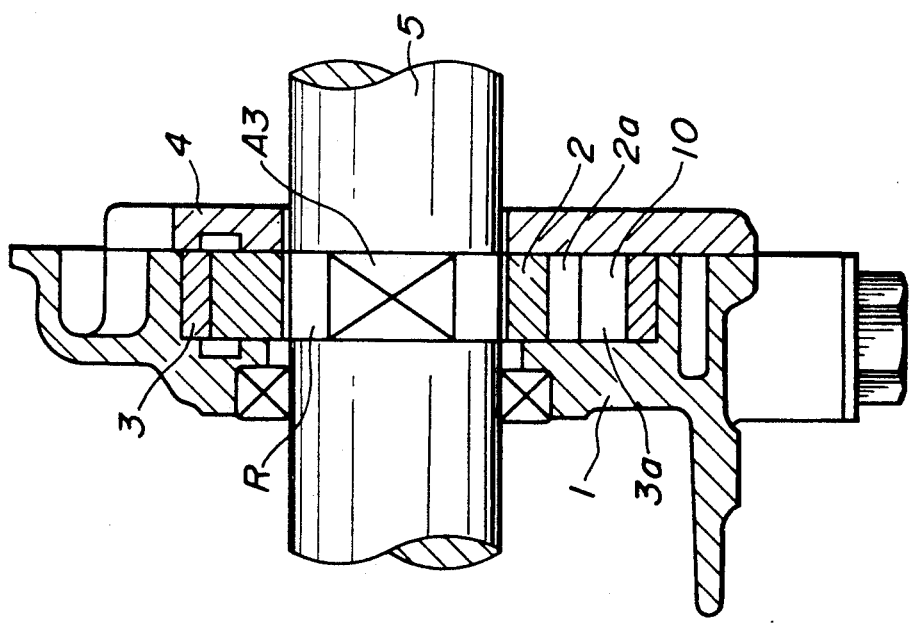
FIG. 2 is a sectional view taken in the direction of arrows substantially along the line II—II of FIG. 1.

Referring now to FIGS. 1 and 2 of the drawings, an embodiment of an oil pump arrangement according to the present invention is illustrated by the reference character P. The oil pump P of this embodiment is for pressurizing oil from an oil reservoir or pan (not shown) of an automotive vehicle to supply the oil into a variety of oil-requiring parts in an engine, though not shown.

The oil pump P is comprised of a pump casing 1 which is formed with a generally flat cylindrical depression 1A. A generally cylindrical or annular outer rotor 3 is slidably rotatably disposed in the flat cylindrical depression 1A of the pump casing 1. The outer rotor 3 has a smooth cylindrical outer peripheral surface in slidable contact with the smooth surface of the cylindrical depression 1A, and is formed with an annular internal gear 3a defining a central opening (not identified). A generally cylindrical inner rotor 2 is rotatably disposed inside or in the central opening of the outer rotor 3 and formed with an annular external gear 2a which is partly in mesh with the internal gear 3a of the outer rotor 3 because the inner rotor 2 is eccentric to the outer rotor 3. It will be understood that an axial dimension of the inner rotor 2 is the same as that of the outer rotor 3, and nearly the same as the that of the flat cylindrical depression 1A.

A pump cover 4 is fixedly secured to the pump casing 1 by bolts or the like (not shown) in a manner to cover the flat cylindrical depression 1A, confining the inner and outer rotors 2, 3 within the flat cylindrical depression 1A. A drive shaft 5 is provided to pierce the pump casing 1 and the pump cover 4, maintaining an oil-tight seal between it and each of the pump casing and cover 1, 4. The inner rotor 2 is securely fittingly and coaxially mounted on the drive shaft 5 so that the axes of them are generally aligned with each other. The inner peripheral surface of the inner rotor 2 is in fitting contact with the outer peripheral surface of the drive shaft 5. In this embodiment, the drive shaft 5 is an end section of a crankshaft of the engine, so that the inner rotor is driven to rotate in relation to engine revolution.

The drive shaft 5 is formed at its peripheral surface with three outer flat surface portions A1, A2, A3 which lie within a generally cylindrical region R facing the inner peripheral surface of the inner rotor 2. The outer flat surface portions A1, A2, A3 are peripherally spaced from each other and located at equal intervals along the periphery of the drive shaft 5. In other words, the flat surface portions A1, A2, A3 are located at equal angular intervals in a cross-section to which the axis of the drive shaft is perpendicular as shown in FIG. 1. Additionally, the flat surface portions A1, A2, A3 are the same in peripheral length. It will be understood that the surfaces of the flat surface portions A1, A2, A3 are not parallel with each other so that the extensions (not shown) of the surfaces of the respective flat surface portions A1, A2, A3 angularly intersect each other.

In connection with the above, the inner rotor 2 is formed at its inner peripheral surface with three inner flat surface portions B1, B2, B3 which are located corresponding respectively to the three outer flat surface portions A1, A2, A3 of the drive shaft 5, so that the flat surface portions B1, B2, B3 face and are contactable with the flat surface portions A1, A2, A3, respectively. The inner rotor 2 and the drive shaft 5 are fitted with each other, forming a slight clearance therebetween so as to allow a relative movement therebetween in the axial direction.

As shown in FIG. 1, the teeth of the inner rotor external gear 2a and the outer rotor internal gear 3a are partly out of mesh so as to leave a plurality of spaces or volume chambers 10 which are filled with oil drawn from an oil inlet chamber 6. The oil inlet chamber 6 is communicated through an oil inlet port 7 with the oil reservoir. The oil filling the volume chambers 10 is discharged to an oil outlet chamber 8 which is communicated through an oil outlet port 9 to the oil-requiring parts in the engine.

The manner of operation of the oil pump arrangement P will be discussed along with advantageous effects.

As the engine runs rotating the crankshaft including the drive shaft 5, the inner rotor 2 is driven to rotate in the direction of an arrows indicated in FIG. 1. Then, the inner rotor 2 rotates causing the outer rotor 3 to rotate, in which the gears 2a, 3a of the inner and outer rotors 2, 3 partly mesh with each other and partly come out of mesh from each other. Accordingly, oil introduced to the oil inlet chamber 6 is carried through the volume chambers 10 to the oil outlet chamber 8, accomplishing a pumping action of the oil. During such pumping action, as usual, the oil outlet chamber 8 becomes higher in oil pressure than the oil inlet chamber 6, so that the inner and outer rotors 2, 3 receive a force directed from the side of the oil outlet chamber 8 to the side of the oil inlet chamber 6.

During driving rotation of the drive shaft 5, the torque of the drive shaft 5 is transmitted from each outer flat surface portion A1, A2, A3 of the drive shaft 5 to each inner flat surface portion B1, B2, B3 of the inner rotor 2. More specifically, such torque transmission is made through a line at which the end of each outer flat surface portion A1, A2, A3 contacts the corresponding inner flat surface portion B1, B2, B3 of the inner rotor 2 as shown in FIG. 1, because there is the slight clearance between the peripheral surface of the drive shaft 5 and the inner peripheral surface of the inner rotor 2. At this time, even when the biasing force (due to the pressure differential) directed from the side of the oil outlet chamber 8 to the side of the oil inlet chamber 6 is applied to the inner rotor 2, movement of the inner rotor 2 is resisted by at least one of the outer flat surface portions A1, A2, A3 of the drive shaft 5, thereby effectively preventing the inner rotor 2 from shifting toward the side of the oil inlet chamber 6.

In contrast, according to the conventional oil pumps in which torque of the drive shaft is transmitted through the two parallel flat surface portions to the inner rotor, there are two moments at which no resistance force is produced against the movement of the inner rotor, during one rotation of the drive shaft.

While the three flat surface portions A1, A2, A3 and B1, B2, B3 have been shown and described as being formed in the inner rotor 2 and the drive shaft 5, it will be understood that the number of the flat surface portions A1, A2, A3 and B1, B2, B3 may be increased (for example, five, seven and eight) over three, maintaining a relationship in which all the flat surface portions are not parallel with each other.

Figure 4:
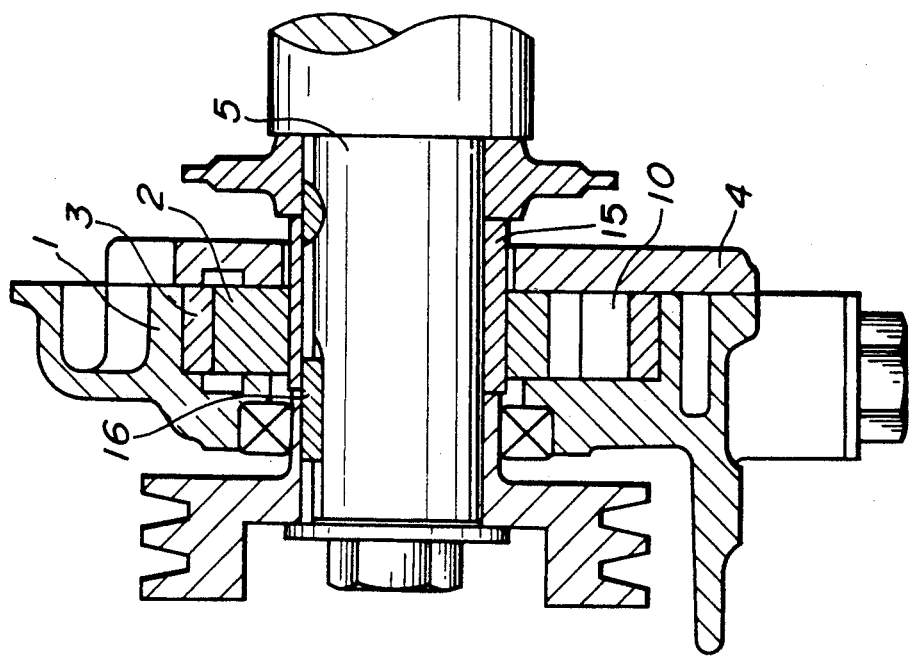
FIG. 4 is a sectional view taken in the direction of arrows substantially along the line IV—IV of FIG. 3.
Figure 3:
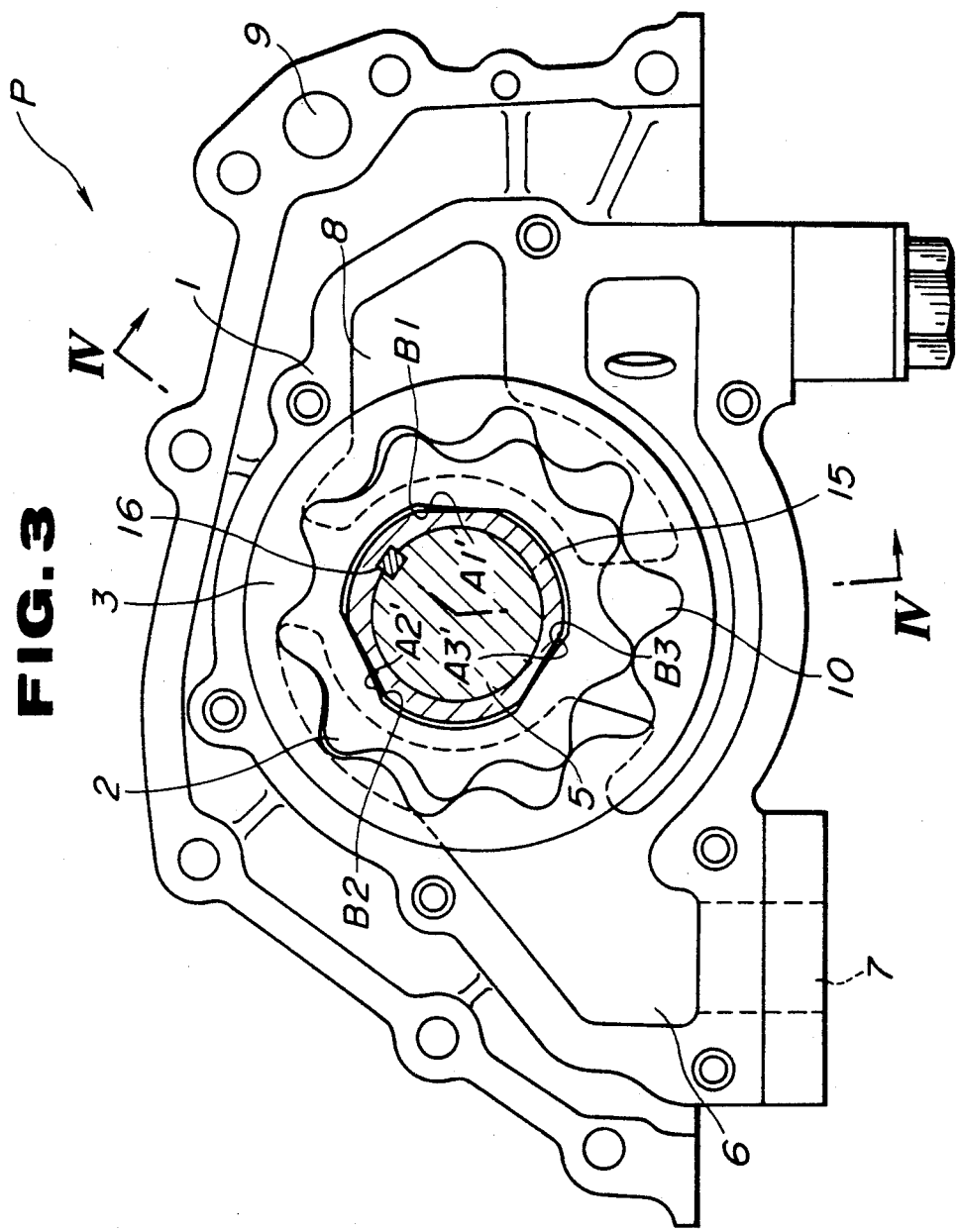
FIG. 3 is a front elevation of another embodiment of the oil pump in accordance with the present invention.

FIGS. 3 and 4 illustrate another embodiment of the oil pump arrangement according to the present invention, which is similar to the embodiment of FIGS. 1 and 2 except for provision of a drive spacer 15. In this embodiment, the cylindrical drive spacer 15 is interposed between the drive shaft 5 and the inner rotor 2. The drive shaft 5 in this embodiment is formed with no flat surface portion, so that the drive spacer 15 is peripherally fixed to the drive shaft 5 by means of a key 16 disposed in key grooves (not identified) formed in the drive spacer 15 and the drive shaft 5.

The drive spacer 15 is formed at its peripheral surface with three outer flat surface portions A1′, A2′, A3′ which are located corresponding and facing respectively to the three inner flat surface portions B1, B2, B3 of the inner rotor 2. Thus, the outer flat surface portions A1′, A2′, A3′ of this embodiment correspond respectively to those A1, A2, A3 of the drive shaft 5 in the embodiment of FIGS. 1 and 2. It will be understood that this embodiment can offer the same advantageous effects as those in the embodiment of FIG. 1 and 2.

It will be appreciated that, in the above embodiments, the inner rotor can be prevented from shifting in a radial direction, and therefore it has been made possible to omit a conventional cylindrical flange portion (not shown) formed in an inner rotor and inserted in the central opening of a pump casing. Accordingly, the inner rotor 2 of the embodiments is rectangular in cross-section. This omits a power loss generated due to the existence of the flange portion, thereby reducing power consumption in the oil pump.

What is claimed is:
1. An oil pump comprising:
 a pump casing;
 a generally annular outer rotor rotatably disposed in said pump casing and having an internal gear;
 a generally annular inner rotor rotatably disposed inside said outer rotor and having an external gear which is partly in mesh with the internal gear of said outer rotor, said inner rotor having a generally cylindrical inner peripheral surface and being formed at the inner peripheral surface with at least three flat surface portions which are peripherally separate from each other, extensions of said respective flat surface portions intersecting each other;

a drive shaft on which said inner rotor is coaxially and fixedly mounted, said drive shaft having a generally cylindrical peripheral surface and being formed at the peripheral surface with at least three flat surface portions which are respectively contactable with said at least three flat surface portions of said inner rotor, the at least three flat surface portions of said drive shaft being generally parallel respectively with at least three flat surface portions of said inner rotor; and means by which a pressure differential of oil is applied to said drive shaft to force said drive shaft radially.

2. An oil pump as claimed in claim 1, wherein said at least three flat surface portions of said inner rotor are located at equal intervals in a peripheral direction.

3. An oil pump as claimed in claim 1, wherein said outer rotor has a smooth outer peripheral surface which is slidable on a smooth cylindrical surface of said pump casing.

4. An oil pump as claimed in claim 1, wherein said drive shaft includes a generally cylindrical main body, and a cylindrical drive spacer interposed in said main body and said inner rotor, said drive spacer being fixed to said main body with a key and formed at its peripheral surface with the at least three flat surface portions.

5. An oil pump as claimed in claim 1, wherein said drive shaft forms part of a crankshaft of an engine.

6. An oil pump as claimed in claim 1, wherein said inner rotor is axially moveable relative to said drive shaft.

7. An oil pump as claimed in claim 1, further comprising clearance between said flat surface portions of said drive shaft and the corresponding flat surface portions of said inner rotor.

* * * * *